INVENTOR.
Douglas Johnson
BY Paul Fitzpatrick
ATTORNEY

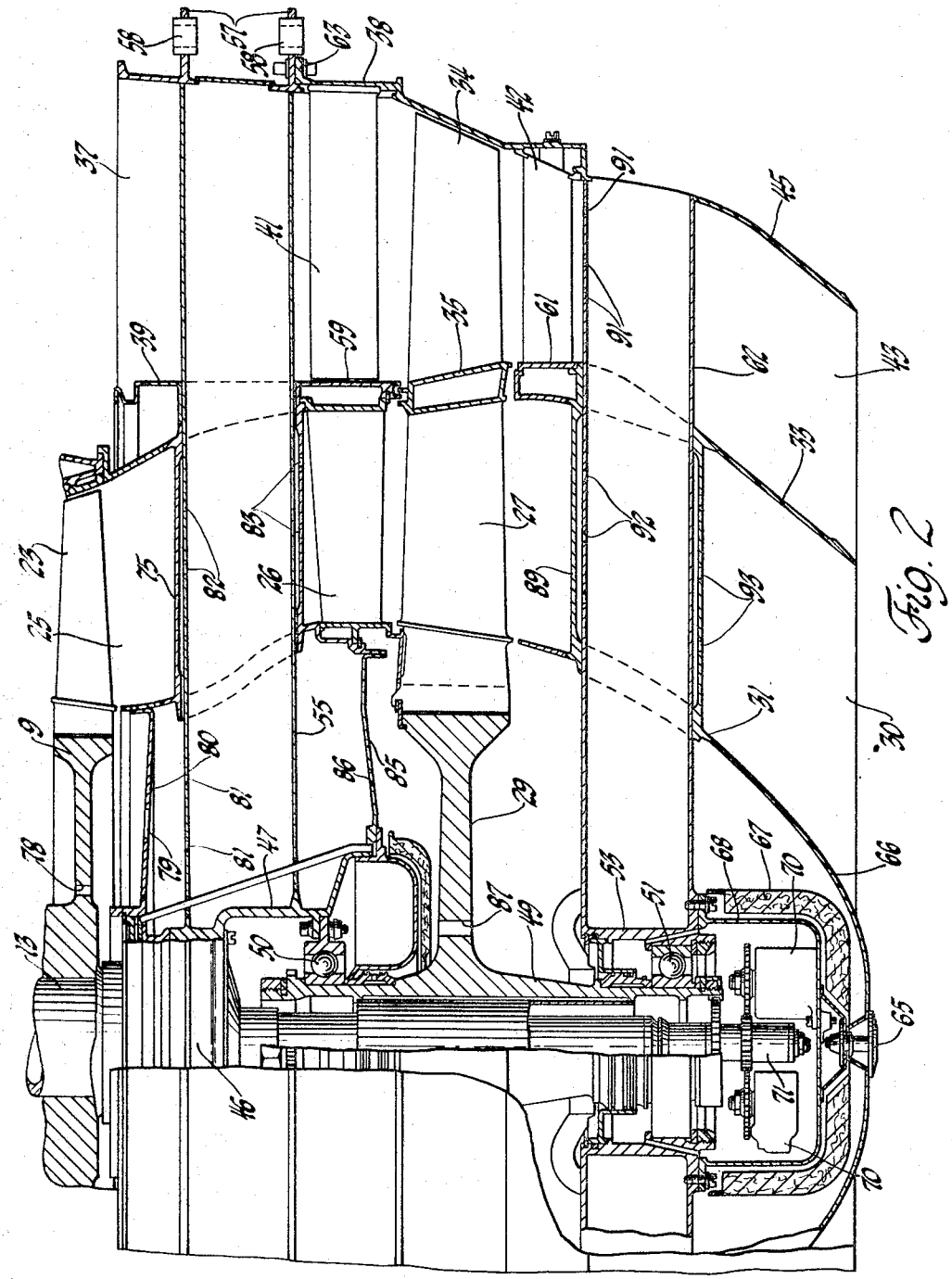

United States Patent Office 3,332,242
Patented July 25, 1967

3,332,242
AFT FAN JET ENGINE
Douglas Johnson, Indianapolis, Ind., assignor to General Motors Corporation, Detroit, Mich., a corporation of Delaware
Filed Mar. 31, 1965, Ser. No. 444,123
7 Claims. (Cl. 60—226)

ABSTRACT OF THE DISCLOSURE

An aft fan jet engine in which the fan rotor is supported by struts crossing the fan duct and turbine exhaust duct, the inner ends of the struts mounting thrust bearings for the fan shaft. Thus, axial loads on the exhaust system are transmitted through the shaft as well as through the outer skin. Provision is made for cooling the struts.

---

Figure 1:
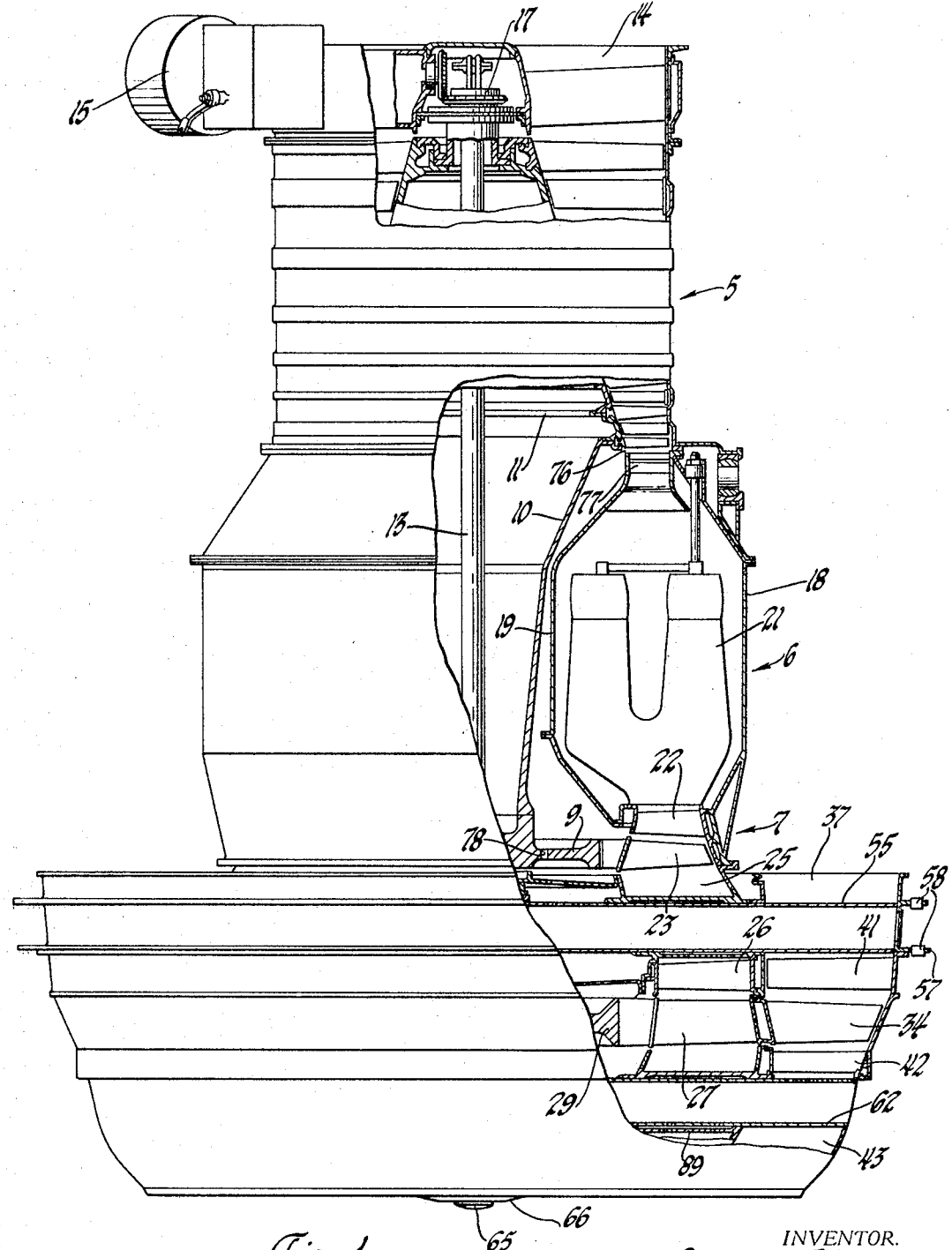

My invention relates to jet propulsion engines, and particularly to lightweight engines of the aft fan type; that is, engines in which a combined turbine and fan rotor stage is disposed downstream of a gas generator turbine so as to provide a large volume propulsive jet. The invention is particularly suited to the requirements of lift engines which must have a very high thrust-to-weight ratio. It involves arrangements for minimizing the load on parts of the aft fan structure and for cooling such structures so that lightweight materials such as titanium alloys may be employed to a large extent.

The principal point of my invention lies in tying the fixed structure of the aft fan engine downstream of the aft fan to the main engine structure ahead of the aft fan through the shaft or hub of the aft fan rotor so that axial loads in the exhaust duct do not have to be carried by the structure of the jet nozzle. Superior arrangements for cooling the fixed parts which cross the turbine exhaust conduit are also important features of the invention.

The nature of the invention and the advantages thereof will be more clearly apparent to those skilled in the art from the succeeding detailed description of the preferred embodiment of the invention and the accompanying drawings thereof, in which:

FIGURE 1 is an elevation view, with parts cut away, of a lift engine with its axis vertical, and FIGURE 2 is an enlarged partial sectional view of the engine shown in FIGURE 1.

Referring first to FIGURE 1, the lift engine comprises a compressor 5, combustion apparatus 6, and a turbine 7, these constituting a gas generator or basic jet engine. Since the structure of the gas generator is of little moment to my invention, it will be described only briefly. The turbine comprises a wheel 9 connected by a tapering shaft 10 of large diameter to the compressor rotor 11 consisting of a number of rings fixed together and supporting rotor blades. An oil tube 13 extends through the shaft 10 and the compressor rotor. Air enters the engine through an inlet frame 14 on which various engine accessories 15 are mounted to be driven through the gearing 17. The compressor discharges to a combustion space defined by outer and inner walls 18 and 19, within which a double annular combustion chamber 21 is mounted. The combustion apparatus discharges through turbine nozzle 22 and blades 23 mounted on wheel 9 into an exhaust duct 25. Referring also to FIGURE 2, the duct 25 conducts the motive fluid into a second or fan turbine comprising a ring of nozzle vanes 26 and blades 27 mounted on a wheel 29. The fan turbine discharges through an annular duct 30 defined by an inner wall 31 and an intermediate wall 33.

Fan blades 34 forming part of the aft fan are mounted on the outer ends of turbine blades 27, with a shroud ring 35 disposed between the turbine and fan blades. The fan is supplied with air through an annular duct 37 defined by the outer wall or case 38 of the engine and an interior shroud 39. A ring of stator vanes 41 is disposed upstream of the fan and a second ring of stator vanes 42 is disposed downstream of the fan. The air pumped by the aft fan is discharged through the annular duct 43 defined by the intermediate wall 33 and the rear end portion 45 of the outer wall or case of the engine. Thus, it will be seen that there is an inner annular path for flow of combustion products through the two turbines and an outer annular path for flow of air through the fan, both flows being discharged to provide jet thrust or, as here described, lift. The forward turbine wheel 9 and the rear end of shaft 10 are supported by a bearing 46 mounted in an annular support 47. The fan turbine wheel 29 is integral with a hollow shaft 49 the forward end of which is supported by a ball bearing 50 mounted in the support ring 47 and the rear end of which is supported by a ball bearing 51 fixed in a ring 53.

Support ring 47 is welded or otherwise fixed to a number (preferably six) of radial struts 55 which pass through the turbine duct 25 and fan intake 37 and terminate at the outer case 38 where they are fixed to stiffener rings 57 bearing engine mounting bosses 58. These bosses, three sets of which are disposed around the fan, provide the means for mounting the engine in the aircraft and transferring the lift from the engine to the aircraft structure. The thrust or lift of the aft fan is transmitted to the struts 55 through the ball bearing 50.

The outer boundary of the flow path through the turbine and the inner boundary of the flow path through the fan are defined by annular shroud structures 59 and 61 forming part of the intermediate wall which provide a labyrinth seal with the shroud 35 on the fan and minimize leakage of fluid between the inner and outer flow paths. The exhaust duct structure comprising the annular walls 31, 33, and 45 is supported in part from the outer case 38 but largely from the inner ring 53. The wall 45 and ring 53 are connected by a number of radial struts 62 which are welded or otherwise fixed at their inner and outer ends and on which the walls 31 and 33 may slide radially. Thus, the exhaust duct structure downstream of the fan, including fixed shroud 61 and blades 42 and the outer case 38 up to the bolting flange 63, is essentially one self-supporting assembly which may be removed as a unit from the engine.

A bolt 65 retains a cover 66, which is the tailcone of the inner or turbine exhaust duct, and a heat insulating cover 67. Within cover 67 an oil pump housing 68 is bolted to the bearing support ring 53. Bearing 51 is retained in this support and on the stub shaft 49 by spanner nuts. Oil pumps 70 within the housing 68 are driven by a shaft 71 splined to the interior of fan shaft 49. Oil is circulated through the tube 13.

Since the struts 55 take the thrust of the engine in operation and cross the turbine exhaust duct 25, means are provided to cool the struts so that they may be made of thin sections of lightweight material and yet have sufficient strength. To this end, the struts 55 are enclosed in shrouds 75 of heat-resistant sheet metal which extend across the exhaust duct 25, that is, from the inner wall of the exhaust duct to the intermediate wall. The shrouds 75 surround and are slightly spaced from the struts 55 which are slidable within the shrouds to accommodate relative radial expansion of the parts. Cooling air, which may be air leaking through the clearance at 76 (FIGURE 1) between the compressor rotor and the compressor stator structure 77, may flow through the annulus between the combustion chamber wall 19 and the shaft 10 and through one or more metering holes 78 in the disk of the turbine wheel 9. This air then flows through openings 79 in a fixed baffle plate 80 and into the space between the turbine wheels 9 and 29. Some of the air flows through a number of openings 81 in the radially inner portion of struts 55, from which it flows radially outward through the strut and through orifices 82 in the leading edge of the strut within the heat shield or shroud 75. The air is thus released adjacent the leading edge of the shroud and flows through the space between the strut and the shroud to outlets 83 in the downstream or trailing edge of the shroud. This air thus blankets the strut and cools to a considerable extent both the strut and its shroud. By this means the central portion of the strut may be kept much cooler than the motive fluid passing through the duct 25, typically at 800° to 900° F. The leakage air is at sufficient pressure for the purpose because the motive fluid has been expanded through turbine nozzle 22 and blade 23 upstream of the duct 25. The cooling of the struts enables them to be made of thin lightweight material such as titanium alloy and yet to have sufficient strength to carry the thrust of the engine to the stiffening rings 57 at the exterior of the casing and thus through mounts 58 to the airframe.

Some of the cooling air may flow through openings such as 86 in a diaphragm 85 within the fan turbine nozzle vanes 26 and through one or more holes 87 in the wheel 29. This air may leak into the turbine exhaust through the gaps upstream and downstream of the blades 27 and thus fill the space within the wall 31 and cone 66 with relatively cool air, excluding the hot motive gases.

The struts 62 which connect the rear fan bearing 51 and the rear walls 31, 33, and 45 are also provided with shrouds to shield them from the hot exhaust gas and with means for circulating cooling air. In this case, the shrouds 89 extending from wall 31 to wall 33 are similar to shrouds 75. At the location of the struts 62, however, the cooling air is taken from the discharge of aft fan 34 through orifices 91 in the leading edge of the portion of struts 62 extending across the fan outlet duct 43. This air is at higher pressure than the gas in the turbine exhaust duct 30. It flows through openings 92 in the leading edge of the strut 62 and through the space between the strut and its shroud 89, being exhausted from openings 93 in the trailing edge of the shroud. As will be seen, this provides cooling both of the strut and of its shroud in the hot area of the turbine exhaust.

The gas pressures on the exhaust structure downstream of the aft fan tend to move it downstream, whereas the turbofan itself exerts a thrust in the upstream direction. The sum of the two, therefore, is less than either. The resultant of the loads on the exhaust structure and on the turbofan are transmitted through bearing 50 to the main load-carrying struts 55 which transmit the thrust to the case reinforcing rings 57 and thus to the aircraft structure.

The flexibility of the attachment of struts 62 at their outer ends to wall 45 and at their inner end to ring 53 (due to the lightness of the structure) is such as to preclude excessive stress in this redundant structure because of thermal expansion.

By virtue of the reduction of stress on the parts and the reduction of temperature, the struts 55 and 62 shown in FIGURE 2 may be made of titanium alloys. Parts directly contacted by hot gas are made of suitable high temperature materials. The liberal employment of titanium alloy and the ability to use thin sections of the metal results in very light weight in what is a rather bulky and complex structure. This is of great importance in aircraft and extremely so where lift engines are concerned, because the ratio of thrust to weight of such an engine must be on the order of 20 to 1 for the engine to be practical.

The detailed description of the preferred embodiment of the invention for the purpose of illustrating the principles thereof is not be considered as limiting the invention, since many modifications may be made by the exercise of skill in the art.

I claim:
1. A jet propulsion engine comprising a gas generator embodying a compressor, a combustion apparatus, and a turbine driving the compressor,
   means including inner and intermediate walls defining an exhaust conduit from the turbine terminating in a jet nozzle,
   an outer wall disposed concentrically with and radially outward of the first-mentioned walls, the outer and intermediate walls defining a fan duct terminating in a jet nozzle,
   a fan rotor journaled within the inner wall provided with turbine blades in the exhaust conduit and with fan blades in the fan duct,
   a set of forward radial struts extending from the outer wall into the engine between the turbine and fan rotor,
   vanes in the conduit and duct between the forward struts and the fan rotor,
   means for supporting the engine in the plane of the said struts,
   a forward thrust bearing coupling the struts to the fan rotor,
   a set of rear radial struts extending across the walls into the engine downstream of the fan rotor and establishing the concentricity of the downstream ends of the walls,
   a rear thrust bearing between the rear struts and the fan rotor so that axial thrust on the rear struts is transferred through the said thrust bearings and fan rotor to the forward struts,
   a tailcone coupled to the fan rotor through the rear thrust bearing,
   a shroud disposed around each of the forward struts and extending across the exhaust conduit,
   means for admitting cooling air under pressure into the shrouds,
   the shrouds having air outlets into the exhaust conduit upstream of the fan rotor turbine vanes,
   a shroud extending across the exhaust conduit enclosing each strut of the rear set,
   air entrance openings at the leading edge of the struts of the rear set within the fan duct,
   air outlets from the struts of the rear set within the exhaust conduit and shroud,
   and air outlets from the rear strut shrouds into the exhaust conduit so that cool air is supplied through the struts into the shrouds and discharged into the exhaust conduit.

2. A jet propulsion engine comprising a gas generator embodying a compressor, a combustion apparatus, and a turbine driving the compressor,
   means including inner and intermediate walls defining an exhaust conduit from the turbine terminating in a jet nozzle,
   an outer wall disposed concentrically with and radially outward of the first-mentioned walls, the outer and intermediate walls defining a fan duct terminating in a jet nozzle,
   a fan rotor journaled within the inner wall provided with turbine blades in the exhaust conduit and with fan blades in the fan duct,
   a set of forward radial struts extending from the outer wall into the engine between the turbine and fan rotor,
   a set of rear radial struts extending across the walls into the engine downstream of the fan rotor and establishing the concentricity of the downstream ends of the walls,
   a shroud disposed around each of the forward struts and extending across the exhaust conduit,
   means for admitting cooling air under pressure into the shrouds,
   the shrouds having air outlets into the exhaust conduit upstream of the fan rotor, a shroud extending across the exhaust conduit enclosing each strut of the rear set, air entrance openings at the leading edge of the struts of the rear set within the fan duct, air outlets from the struts of the rear set within the exhaust conduit and shroud, and air outlets from the rear strut shrouds into the exhaust conduit so that cool air is supplied through the struts into the shrouds and discharged into the exhaust conduit.

3. A jet propulsion engine comprising a gas generator embodying a compressor, a combustion apparatus, and a turbine driving the compressor, means including inner and intermediate walls defining an exhaust conduit from the turbine terminating in a jet nozzle, an outer wall disposed concentrically with and radially outward of the first mentioned walls, the outer and intermediate walls defining a fan duct terminating in a jet nozzle, a fan rotor journaled within the inner wall provided with turbine blades in the exhaust conduit and with fan blades in the fan duct, a set of forward radial struts extending from the outer wall into the engine between the turbine and fan rotor, means for supporting the engine in the plane of the said struts, a forward thrust bearing coupling the struts to the fan rotor, a set of rear radial struts extending across the walls into the engine downstream of the fan rotor and establishing the concentricity of the downstream ends of the walls, and a rear thrust bearing betwen the rear struts and the fan rotor so that axial thrust on the rear struts is transferred through the said thrust bearings and fan rotor to the forward struts.

4. A jet propulsion engine comprising a gas generator embodying a compressor, a combustion apparatus, and a turbine driving the compressor, means including inner and intermediate walls defining an exhaust conduit from the turbine terminating in a jet nozzle, an outer wall disposed concentrically with and radially outward of the first-mentioned walls, the outer and intermediate walls defining a fan duct terminating in a jet nozzle, a fan rotor journaled within the inner wall provided with turbine blades in the exhaust conduit and with fan blades in the fan duct, a set of forward radial struts extending from the outer wall into the engine between the turbine and fan rotor, a forward thrust bearing coupling the struts to the fan rotor, a set of rear radial struts extending across the walls into the engine downstream of the fan rotor and establishing the concentricity of the downstream ends of the walls, a rear thrust bearing between the rear struts and the fan rotor so that axial thrust on the rear struts is transferred through the said thrust bearings and fan rotor to the forward struts, a tailcone coupled to the fan rotor through the rear thrust bearing, a shroud disposed around each of the forward struts and extending across the exhaust conduit, a shroud extending across the exhaust conduit enclosing each strut of the rear set, and means for circulating cooling air within both sets of strut shrouds.

5. A jet propulsion engine comprising a gas generator embodying a compressor, a combustion apparatus, and a turbine driving the compressor, means including inner and intermediate walls defining an exhaust conduit from the turbine terminating in a jet nozzle, an outer wall disposed concentrically with and radially outward of the first-mentioned walls, the outer and intermediate walls defining a fan duct terminating in a jet nozzle, a fan rotor journaled within the inner wall provided with turbine blades in the exhaust conduit and with fan blades in the fan duct, a set of forward radial struts extending from the outer wall into the engine between the turbine and fan rotor, a forward thrust bearing coupling the struts to the fan rotor, a set of rear radial struts extending across the walls into the engine downstream of the fan rotor and establishing the concentricity of the downstream ends of the walls, a rear thrust bearing between the rear struts and the fan rotor so that axial thrust on the rear struts is transferred through said thrust gearings and fan rotor to the forward struts, a tailcone coupled to the fan rotor through the rear thrust bearing, a shroud disposed around each of the forward struts and extending across the exhaust conduit, means for admitting cooling air under pressure through the struts into the shrouds, the shrouds having air outlets into the exhaust conduit upstream of the fan rotor, a shroud extending across the exhaust conduit enclosing each strut of the rear set, and means for circulating cooling air from the fan through the last-mentioned shrouds.

6. A jet propulsion engine as defined in claim 3 including also means for cooling the portions of both the forward and rear struts between the inner and intermediate walls.

7. A jet propulsion engine as defined in claim 4 in which the last recited means includes means for circulating the cooling air between the struts and the shrouds therefor.

References Cited

UNITED STATES PATENTS

| | | | | |
|---|---|---|---|---|
| 2,961,150 | 11/1960 | Pirtle | 230— | 116 |
| 3,045,965 | 7/1962 | Bowmer | 253— | 39.1 |
| 3,222,017 | 12/1965 | Bobo | 244— | 54 |

MARK NEWMAN, *Primary Examiner.*

D. HART, *Assistant Examiner.*